US012638978B2

(12) United States Patent
Mienkina et al.

(10) Patent No.: US 12,638,978 B2
(45) Date of Patent: May 26, 2026

(54) MEMORY CONTROLLER HAVING A WRITE BUFFERS

(71) Applicant: NXP USA, Inc., Austin, TX (US)

(72) Inventors: Martin Mienkina, Bystrice Nad Olsi (CZ); Timothy Strauss, Granger, IN (US); Prakashkumar Govindbhai Makwana, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/889,852

(22) Filed: Sep. 19, 2024

(65) Prior Publication Data

US 2026/0079622 A1 Mar. 19, 2026

(51) Int. Cl.
G06F 3/06 (2006.01)
G06F 12/0879 (2016.01)
G06F 13/28 (2006.01)

(52) U.S. Cl.
CPC .......... G06F 3/0613 (2013.01); G06F 3/0659 (2013.01); G06F 3/0673 (2013.01); *G06F 12/0879* (2013.01); *G06F 13/28* (2013.01)

(58) Field of Classification Search
CPC .... G06F 3/0613; G06F 3/0659; G06F 3/0673; G06F 12/0879; G06F 13/28
See application file for complete search history.

(56) References Cited

U.S. PATENT DOCUMENTS

| | | | |
|---|---|---|---|
| 6,496,905 | B1 | 12/2002 | Yoshioka et al. |
| 8,327,065 | B2 | 12/2012 | Yano et al. |
| 9,001,607 | B2 | 4/2015 | Ong |
| 9,214,045 | B1 | 12/2015 | Strauss et al. |
| 10,152,410 | B2 | 12/2018 | Solihin |
| 10,452,531 | B1 | 10/2019 | Jung et al. |
| 10,579,303 | B1 | 3/2020 | Li et al. |
| 11,120,851 | B1 | 9/2021 | Fujioka |
| 2009/0248994 | A1* | 10/2009 | Zheng ..................... G06F 13/28 |
| | | | 711/E12.001 |
| 2015/0248363 | A1* | 9/2015 | Dumoulin ............... G06F 13/28 |
| | | | 710/308 |
| 2020/0081654 | A1 | 3/2020 | Chan et al. |
| 2021/0405885 | A1* | 12/2021 | Kim ..................... G06F 3/0673 |
| 2022/0269605 | A1 | 8/2022 | Kim et al. |
| 2023/0153247 | A1 | 5/2023 | Rao |
| 2023/0326500 | A1 | 10/2023 | Park et al. |

FOREIGN PATENT DOCUMENTS

| | | |
|---|---|---|
| CN | 104461399 B | 8/2018 |
| WO | 2012081730 A1 | 6/2012 |

\* cited by examiner

*Primary Examiner* — Janice M. Girouard
(74) *Attorney, Agent, or Firm* — Joanna G. Geld

(57) ABSTRACT

A non-volatile memory (NVM) controller is configured to control reads from and writes to an NVM array, and includes a write buffer and a buffer control circuit. The write buffer includes a plurality of entries, each configured to store a write access having a corresponding page address of the NVM array and corresponding write data. The buffer control circuit is configured to store a write access having a corresponding page address of the NVM array and corresponding write data, and generate burst writes from the write buffer to the NVM array. The buffer control circuit generates a burst write by sequentially selecting write accesses from the write buffer which have consecutive page addresses, in which the length of the burst write is undefined when the burst write to the NVM array is initiated.

19 Claims, 5 Drawing Sheets

| ENTRY NUMBER | PAGE ADDRESS | V | WRITE DATA |
|---|---|---|---|
| 1 | 0 | 1 | D1 |
| 2 | 1 | 1 | D2 |
| 3 | 2 | 1 | D3 |
| 4 | 8 | 1 | D4 |
| 5 | 9 | 1 | D5 |
| 6 | 6 | 1 | D6 |

FIG.3

| ENTRY NUMBER | PAGE ADDRESS | V | WRITE DATA |
|---|---|---|---|
| 1 | 0 | 1 | D1 |
| 2 | 2 | 1 | D3 |
| 3 | 8 | 1 | D4 |
| 4 | 1 | 1 | D2 |
| 5 | 9 | 1 | D5 |
| 6 | 6 | 1 | D6 |

FIG. 4

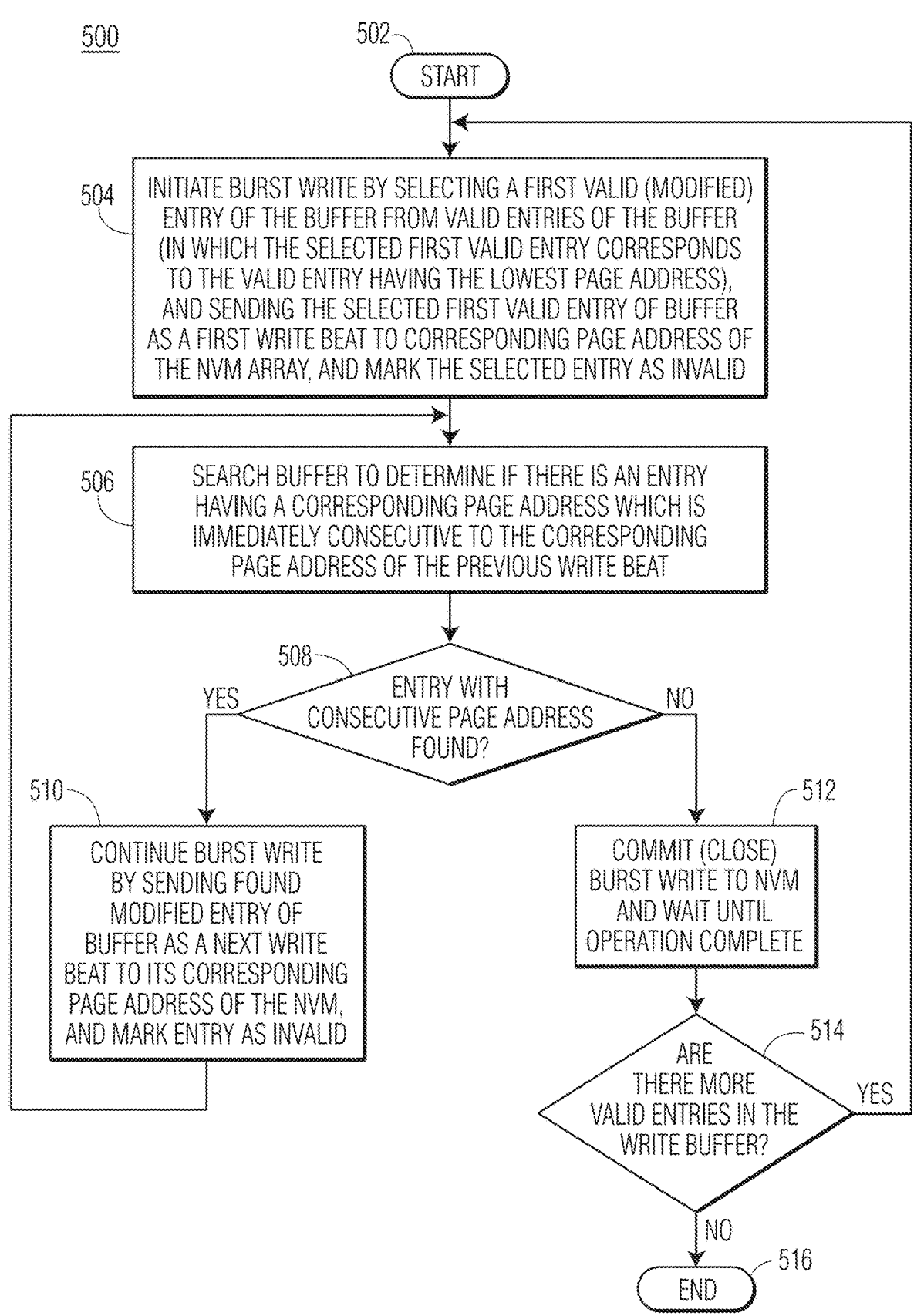

500

502 START

504 INITIATE BURST WRITE BY SELECTING A FIRST VALID (MODIFIED) ENTRY OF THE BUFFER FROM VALID ENTRIES OF THE BUFFER (IN WHICH THE SELECTED FIRST VALID ENTRY CORRESPONDS TO THE VALID ENTRY HAVING THE LOWEST PAGE ADDRESS), AND SENDING THE SELECTED FIRST VALID ENTRY OF BUFFER AS A FIRST WRITE BEAT TO CORRESPONDING PAGE ADDRESS OF THE NVM ARRAY, AND MARK THE SELECTED ENTRY AS INVALID

506 SEARCH BUFFER TO DETERMINE IF THERE IS AN ENTRY HAVING A CORRESPONDING PAGE ADDRESS WHICH IS IMMEDIATELY CONSECUTIVE TO THE CORRESPONDING PAGE ADDRESS OF THE PREVIOUS WRITE BEAT

508 ENTRY WITH CONSECUTIVE PAGE ADDRESS FOUND?

YES

NO

510 CONTINUE BURST WRITE BY SENDING FOUND MODIFIED ENTRY OF BUFFER AS A NEXT WRITE BEAT TO ITS CORRESPONDING PAGE ADDRESS OF THE NVM, AND MARK ENTRY AS INVALID

512 COMMIT (CLOSE) BURST WRITE TO NVM AND WAIT UNTIL OPERATION COMPLETE

514 ARE THERE MORE VALID ENTRIES IN THE WRITE BUFFER?

YES

NO

516 END

FIG. 5

MEMORY CONTROLLER HAVING A WRITE BUFFERS

BACKGROUND

Field

This disclosure relates generally to memories, and more specifically, to a memory controller having a write buffer.

Related Art

With respect to memories within a data processing system, memory arrays are typically coupled to a system interconnect of the data processing system via memory controllers in which a memory controller manages read and write communications between a requesting device (e.g. a processor or core) of the data processing system and the memory array. The memory controller may include buffers for write data which allow for a lower latency for communication between the requesting device and the memory controller in performing write operations as compared to the latency between the memory controller and the memory array. This is especially true for non-volatile memories (NVMs). Therefore, a need exists for an improved memory controller between the system interconnect and the memory array in order to achieve improved write performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 3 and 4 illustrate, in diagrammatic form, examples of the read/write buffer of FIG. 2.

FIG. 5 illustrates, in flow diagram form, a method of performing a burst write operation in the NVM of FIG. 1, in accordance of the present invention.

DETAILED DESCRIPTION

In one aspect, in order to improve read and write efficiency in an NVM, a read/write buffer is used within an NVM controller of the NVM to store write data from a requesting device to be written to the NVM array and to store read data from the NVM array to be returned to the requesting device. In one embodiment, the NVM controller can issue burst write accesses from the read/write buffer to the NVM array, in which each burst write can be performed for writing an arbitrary (undefined) number of pages. That is, the number of pages required for each burst write is not fixed to a pre-defined number of pages or is not fixed to be one of a selected number of pre-defined pages. In one embodiment, a burst write is begun by sending a first write beat to a first page from the read/write buffer, and, for each subsequent write beat of the burst write, a write access to a next consecutive page is sent from the read/write buffer until the read/write buffer includes no more consecutive pages, at which point the burst write ends. Therefore, the length of each burst write is dependent upon the contents of the read/write buffer at the time the burst write is initiated rather than being a required pre-defined number. In this manner, the length of the burst write is optimized based on the available contents of the buffer. This flexibility may result in improved write performance of the NVM.

Figure 1:
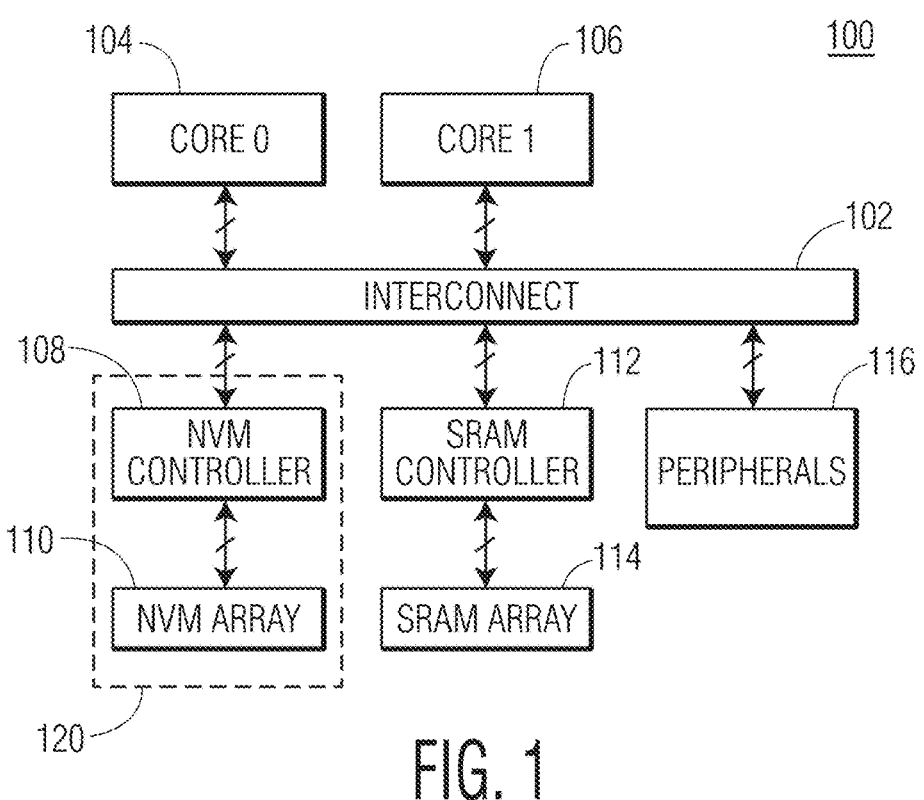
FIG. 1 illustrates, in block diagram form, a data processing system with a non-volatile memory (NVM) having an NVM controller and an NVM array, in accordance with an embodiment of the present invention.

FIG. 1 illustrates, in block diagram form, a data processing system 100 in accordance with an embodiment of the present invention. Data processing system 100 includes any number of cores (e.g. core 0 104 and core 1 106), a system interconnect 102, any number of memory controllers (e.g. NVM controller 108 and static random access memory (SRAM) controller 112), and any number of peripherals 116. Note that data processing system may include more or fewer elements than those illustrated. The cores of system 100 may be any type of processors, and peripherals 116 may include any type of peripheral (e.g. input/output (I/O) circuitry, a direct memory access (DMA) controller, a communication port, etc.). The cores, memory controllers, and peripherals are bidirectionally coupled to system interconnect 102, which may be implemented as a bus, a crossbar switch, interconnect fabric, etc.

In the illustrated embodiment, data processing system 100 also includes memory arrays coupled to their corresponding controller. For example, NVM controller 108 is coupled to NVM array 110, and SRAM controller 112 is coupled to SRAM array 114. A memory may therefore refer to the controller in combination with the corresponding memory array (e.g. NVM 120 includes NVM controller 108 and NVM array 110). Data processing system 100 may be implemented as a system on chip (SoC) and may therefore be referred to as an SoC or an integrated circuit (IC). Note that the memory arrays (e.g. NVM array 110 and SRAM array 114) may each be formed either on the same SoC or IC as the rest of data processing system 100 or may be implemented on separate ICs. Therefore, in some embodiments, data processing system 100 may be described as including the memory controllers but not necessarily the memory arrays.

In operation, a requestor or requesting device of data processing system 100 refers to any device which can send a read or write request to a memory coupled to interconnect 102 (e.g. NVM 120). A requestor may therefore be core 0 104 or core 1 106, or can be another requesting device within peripherals 116 (such as a DMA). Referring to NVM 120, each read or write request to NVM 120 includes a corresponding access address to a location within NVM array 110. A write request further includes corresponding write data to be written into the addressed location. NVM array 110 is organized in rows and columns, and each row of the array may be divided into a number of equal sized pages. For example, in one embodiment, each row includes 16 pages, in which each page includes 32 bytes. However, in alternate embodiments, NVM 120 can be defined differently such that a page can be defined as having fewer or more bytes (e.g. 16 or 64 bytes), and each row can be set up to have fewer or more pages (e.g. 8 or 32 pages).

Figure 2:
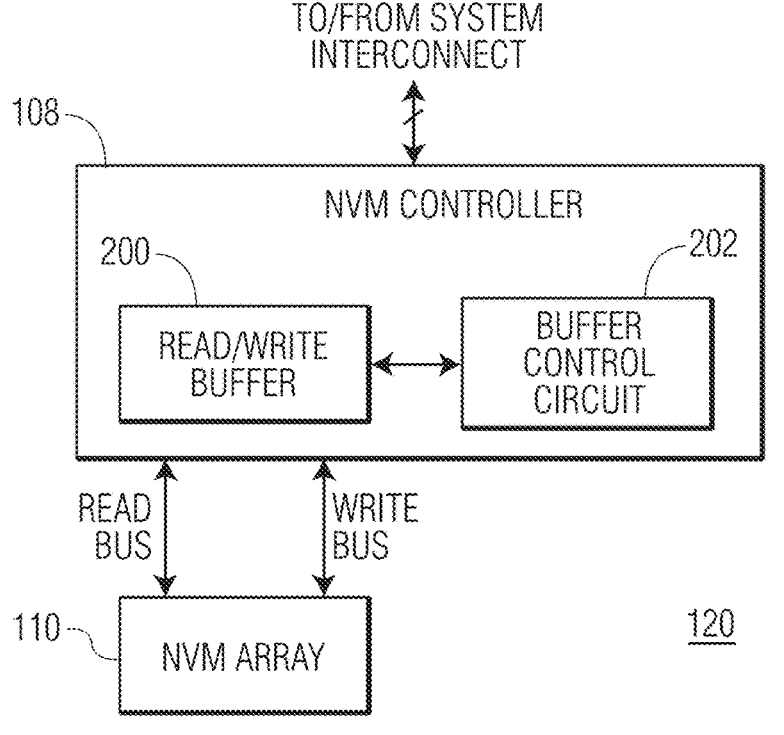
FIG. 2 illustrated, in block diagram form, the memory of FIG. 1, in which the NVM controller includes a read/write buffer, in accordance with an embodiment of the present invention.

FIG. 2 illustrates, in block diagram form, a more detailed view of NVM 120, including a more detailed view of NVM controller 108, in accordance with one embodiment of the present invention. NVM controller 108 includes a read/write buffer 200 and a buffer control circuit 202 coupled to read/write buffer 200. In one embodiment, read/write buffer 200 includes N entries (1 to N), in which each entry is capable of storing read data returned from array 110 to controller 108 via a read bus in response to a read access request and write data to be written to array 110 in response to a write access request. The read data can be stored in read/write buffer 200 before being returned to the requestor via interconnect 102. The write data from a requestor can be stored in read/write buffer 200 before being provided via a write bus from controller 108 to array 110. Therefore, read/write buffer 200 operates as a temporary storage for read and write requests. In alternate embodiments, controller 108 may include separate read and write buffers, each having N entries (or each having a different number of entries). However, in the embodiments described herein, read/write buffer 200 will be described in reference to write requests (and not read requests) and therefore can be referred to simply as write buffer 200 or buffer 200. In this case, read/write buffer 200 may be implemented as just a write buffer (in which controller 108 may also include a separate read buffer). Buffer control circuit 202 includes logic or circuitry to store write data into buffer 200 and to provide write data from buffer 200 to array 110 for storage in array 110. For example, buffer control circuit 202 may include a state machine to control storage of write accesses to buffer 200 and control providing write access from buffer 200 to array 110.

As will be described in reference to the examples of FIGS. 3 and 4 below, each entry of the N entries of buffer 200 is configured to store information for a write access to array 110. Each entry has a unique entry number (1 to N) and is configured to store write data, a corresponding page address for the write data (also referred to as an address tag for the entry), and a corresponding valid bit to indicate whether the entry includes valid or modified data that is yet to be stored into array 110. For example, if the corresponding valid bit is asserted at a logic level one, the entry has valid or modified data that is to be stored into array 110, but if the corresponding valid bit is negated at a logic level 0, the entry does not have valid data (i.e. it is considered an invalid or empty entry). Although the examples of FIGS. 3 and 4 illustrate buffer 200 has having 6 entries, N can be any integer number greater than or equal to two. Note that in alternate embodiments, each entry of the buffer can be organized differently, each field may be implemented with any number of bits, and may include more fields than just page address, write data, and valid bit.

As described above, for each write access request to NVM 120, NVM controller 108 receives the write request via interconnect 102 from the requestor and stores the write data and corresponding page address into an empty entry of buffer 200. The page address is determined from the access address received with the write access request, in which each write access stored in buffer 200 writes a page of write data. For example, in the case that each page includes 32 bytes, each write from buffer 200 stores a block of continuous 32 bytes within array 110 at the page address in buffer 200. In one embodiment, the page address stored in buffer 200 corresponds to a higher significant bit portion of the access address.

In one embodiment, buffer control circuit 202, in addition to storing received write access requests into buffer 200, controls providing the write accesses from buffer 200 to array 110. It is typically more efficient to perform writes to array 110 as burst writes, in which each burst write includes one or more write beats, each write beat writing a page of data. Therefore, a burst write with Y write beats writes Y pages of data. (Note that, as used herein, the length of a burst write, i.e. a burst length, refers to the number of beats within the burst write.) By performing burst writes, overhead between write beats can be reduced. Further, burst writes which do not result in switching rows (i.e. crossing row boundaries) within array 110 may allow for further increased performance since the overhead incurred by switching rows can also be avoided. (Note that, for other embodiments, columns or other array physical optimizations may be possible.) In one embodiment, buffer control circuit 202 generates burst writes to array 110 from buffer 200 in which each the number of write beats in each burst write is not pre-defined. Instead, the number of write beats per burst is determined based on the current contents of buffer 200.

Operation of controller 108 will be described in reference to the buffer examples of FIGS. 3 and 4, as well as the flow diagram of FIG. 5 and the timing diagrams of FIGS. 6 and 7. FIGS. 3 and 4 illustrate two examples of buffer 200 filled by buffer control circuit 202 with 6 valid entries created from 6 received write access requests received by controller 108 (each entry having its corresponding valid bit (V) asserted to a one). In the illustrated examples, 6 write access were received to write data D1-D6, respectively, at corresponding page addresses 0, 1, 2, 8, 9, and 6, respectively. Note that each of D1-D6 represents a page of write data. In the example of FIG. 3, buffer control circuit 202 stored these 6 write accesses into entries 1-6, respectively. In the example of FIG. 4, these 6 write access were instead stored into entries 1, 4, 2, 3, 5, and 6, respectively. However, as will be described in reference to FIGS. 5 and 6, the order in which the write accesses are stored in buffer 200 does not matter, as buffer control circuit 200 can still generate burst writes based on the buffer contents. Therefore, buffer control circuit 200 can use any mechanism to determine a next available entry for storing a received write access request.

FIG. 5 illustrates, in flow diagram form, a method 500 for controller 108 to generate burst writes to array 110 from buffer 200, in accordance with one embodiment of the present invention. FIGS. 6 and 7 illustrate timing diagrams for the clock (folk), signals provided to array 110 from controller 108 on the write bus between the controller and array, and signals received by controller 108 from array 110 on the write bus between the controller and array. The signals from controller 108 to array 110 include a burst enable signal (burst_en), a write address (waddr [24:5]), a write enable signal (wr_en), and the write data (wdata [255:0]). In this example, each page of write data includes 256 bits (e.g. 32 bytes) of data. Note that the write address corresponds to the page address of the write, in which, in the illustrated embodiment, the page address is the upper bits (5-24) of the write access address. The signals received by controller 108 from array 110 include a write address ready signal (array_waready), a write error indicator (array_write_error), and a write valid indicator (array_wvalid). Note that, in alternate embodiments, more signals may be used between controller 108 and array 110, as needed.

Referring to FIG. 5, method 500 beings at start 502 and proceeds to block 504 in which buffer control circuit 202 initiates a burst write by selecting a first valid (modified) entry of buffer 200 from the valid entries of the buffer, and sends this selected first valid entry as a first write beat to the corresponding page address of array 110. (In the illustrated embodiments, the selected first valid entry corresponds to a valid entry with the lowest page address.) The selected entry can then be marked as invalid (by negating the corresponding valid bit). For the example of buffer 200 of FIG. 3, this may correspond to first selecting entry 1 in which D1 is to be written to page address 0. Therefore, referring to FIG. 6, at time buffer control circuit 202 asserts burst_en to a logic level one to initiate a burst write for the selected first valid entry (entry 1). At time t1, burst control circuit 202 drives the page address WA1 (corresponding to page address 0 of entry 1) as waddr [24:5] onto the write bus and asserts wr_en. When array 110 is ready to receive a write beat, it asserts array_waready. Burst control circuit 202 therefore drives WD1 (corresponding to write data D1 of entry 1) as wdata [255:0]) onto the write bus. The V field of entry 1 can then be negated to a logic level zero.

Referring back to FIG. 5, after the first write beat, method 500 proceeds from block 504 to block 506, in which buffer control circuit 202 searches buffer 200 to determine if there is an entry having a corresponding page address which is immediately consecutive (i.e. sequential) to the corresponding page address of the previous write beat (e.g. in which, during the first run, refers to the page address consecutive to the page address of the first write beat). If, at decision diamond 508, such an entry is found, then buffer control circuit 202 continues the burst write by sending the found valid (modified) entry of buffer 200 as the next write beat to its corresponding page address of array 110. This found entry can then be marked as invalid. For the example of buffer 200 of FIG. 3, this next entry may correspond to entry 2 in which D2 is to be written to page address 1 because page address 1 is immediately consecutive to page address 0. Therefore, referring to FIG. 6, burst_en remains asserted and page address WA2 (corresponding to page address 1 of entry 2) is driven onto the write bus at time t2 and write_en is again asserted as well. When array 110 is ready (array_waready is asserted), then WD2 (corresponding to write data D2 of entry 2) is driven onto the write bus. The V field of entry 2 can then be negated to a logic level zero.

At this point, referring back to FIG. 5, the burst write continues in which method 500 returns to block 506 to determine if there is an entry with a next immediately consecutive corresponding page address. In the example of FIG. 3, there is another entry, entry 2, in which D3 is to be written to page address 2, which is immediately consecutive to the previous page address of the burst write (e.g. which was page address 1). Therefore, as seen in FIG. 6, at time t4, the third beat is provided to array 110 in which page address 2 is driven as WA3 and D3 as WD3. (Note that no beat was sent at time t3 since array_waready was not yet asserted to indicate array 110 was ready to receive a next beat.) However, when method 500 returns to block 506 and determines that there is not an entry with a consecutive page address, then, at decision diamond 508, method 500 instead proceeds to block 512 in which the burst write is committed or closed by burst control circuit 202, and burst control circuit 202 then waits until the burst operation is complete. For the example of FIG. 3, after entry number 3 is selected and written as the third beat of the burst write, there is no entry with the next consecutive page address of 3, therefore, the burst write is committed or closed. As seen in FIG. 6, at time t5, burst_en is negated, ending the burst write. In this case, the burst write included only 3 write beats.

Referring back to FIG. 5, in block 512, burst control circuit 202 waits until the burst operation is complete, at which point a write valid indicator is received by burst control circuit 202 along with a write error indicator to indicate that the burst write is complete. For example, as illustrated in FIG. 6, at time t8, array_wvalid is asserted to indicate that the burst write was valid (and correctly completed). If an error had occurred, then an indication of this error can also be sent at time t8, as a write error indicator on array_write_error. Note that at time t7, the array may indicate, by assertion of array_waready, that it is ready to receive another write access.

In FIG. 5, after completion of the burst write at block 512, method 500 proceeds to decision diamond 514 in which burst control circuit 202 determines if there are more valid entries in buffer 200. If so, method 500 returns to block 504 in which another burst write is initiated by selecting one of the remaining valid entries. For the example of FIG. 3, after performing the burst write with entries 1, 2, and 3 from buffer 200, a next (second) burst write can be initiated by selecting the valid entry with the lowest page address (corresponding to entry 4). In this case, the burst write would include a first write beat to write D4 to page address 8 (corresponding to entry 4), and a second write beat to write D5 to page address 9 (corresponding to entry 5). Since there are no entries with writes to page address 10, this burst write would close after only 2 beats. With the example of FIG. 3, burst control circuit 202 could then initiate a third burst write in which remaining valid entry 6 would be selected. In this case, though, the burst write would only include one write beat to write D6 to page address 6 as there are no remaining entries with a write to a page address of 7. Therefore, buffer control circuit 202 continues to generate burst writes until there are no remaining valid entries to select in buffer 200.

Referring to the example of FIG. 4, note that, in this case, the same result would be achieved in generating the first, second, and third burst writes as were described in reference to FIG. 3, even though the write accesses are stored in a different order within buffer 200. In this case, entry 1 would still be selected as the initial (first) write beat of the first burst write. However, in this example, entry 4 would instead be selected as the next (second) write beat of the first burst write because entry 4 includes the write access to page address 1, which is consecutive to page address 0 of the first write beat. Then, entry 2 would be selected as the next (third) write beat of the first burst write because entry 2 includes the write access to page address 2, which is consecutive to page address 1 of the second write beat. Again, the first burst write would end after the third beat write since there is no entry with a write to the next consecutive page address 3. In a similar fashion as with the example of FIG. 3, a second burst write is initiated with the valid entry having the lowest page address (corresponding to entry 3) for a first write beat to page address 8, followed by entry 5 for a second write beat to page address 9. Again, the third burst write would include only one write beat to write D6 to page address 6.

In this manner, by selecting write accesses to consecutive pages from buffer 200 for each burst write, improved write throughput from buffer 200 may be achieved. Each burst write can include any number of write beats, depending on how many write accesses to consecutive pages are stored in buffer 200 at any given time. However, the number of beats is arbitrary and undefined (e.g. the number of beats is not a pre-defined number or one of a set of pre-defined numbers). That is, at the time the burst write is initiated with a first write beat (e.g. at block 504), it is unknown how long the burst write will be, as the burst length is not determined or defined until a valid entry with a consecutive page address can no longer be found in the write buffer, resulting in closing the burst write (e.g. at block 512).

Figure 6:
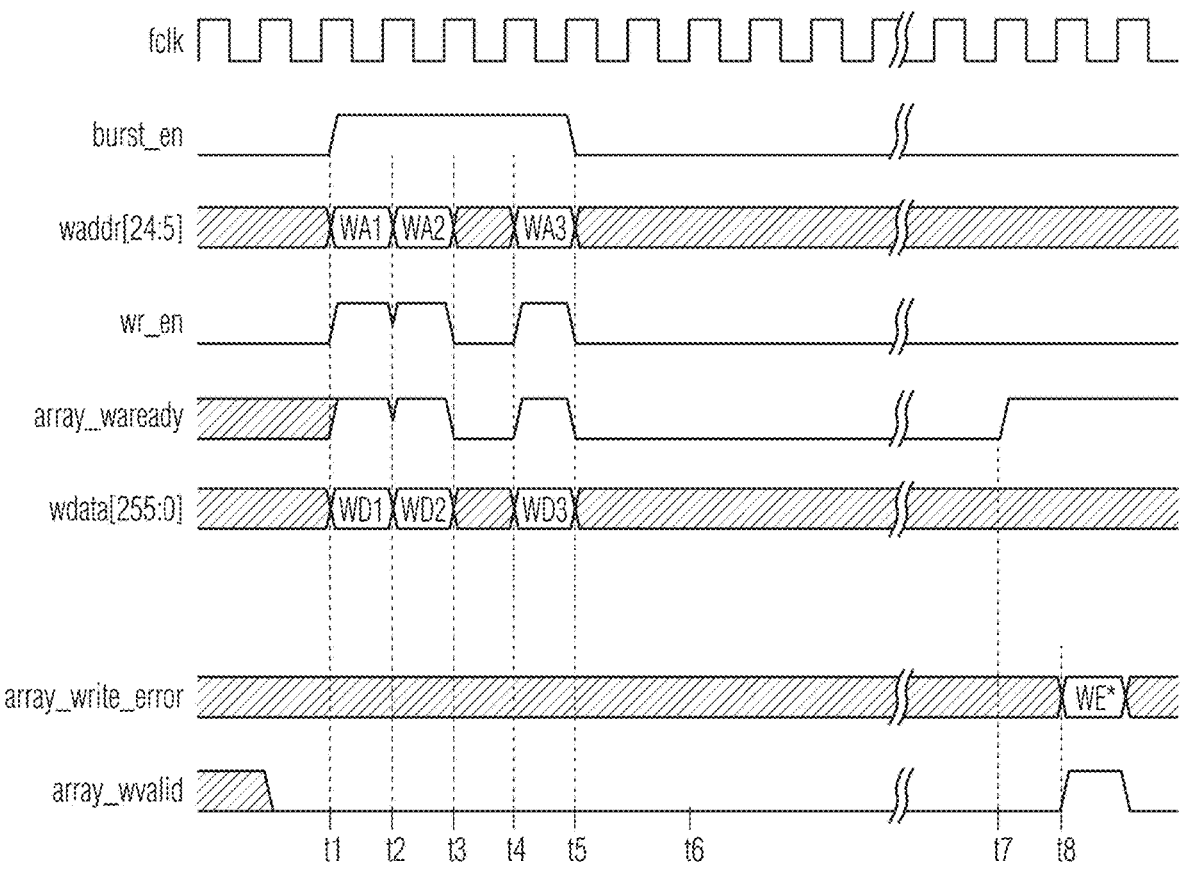
FIGS. 6 and 7 illustrate timing diagrams of various signals used within the NVM of FIG. 1, in accordance with an embodiment of the present invention.
Figure 7:
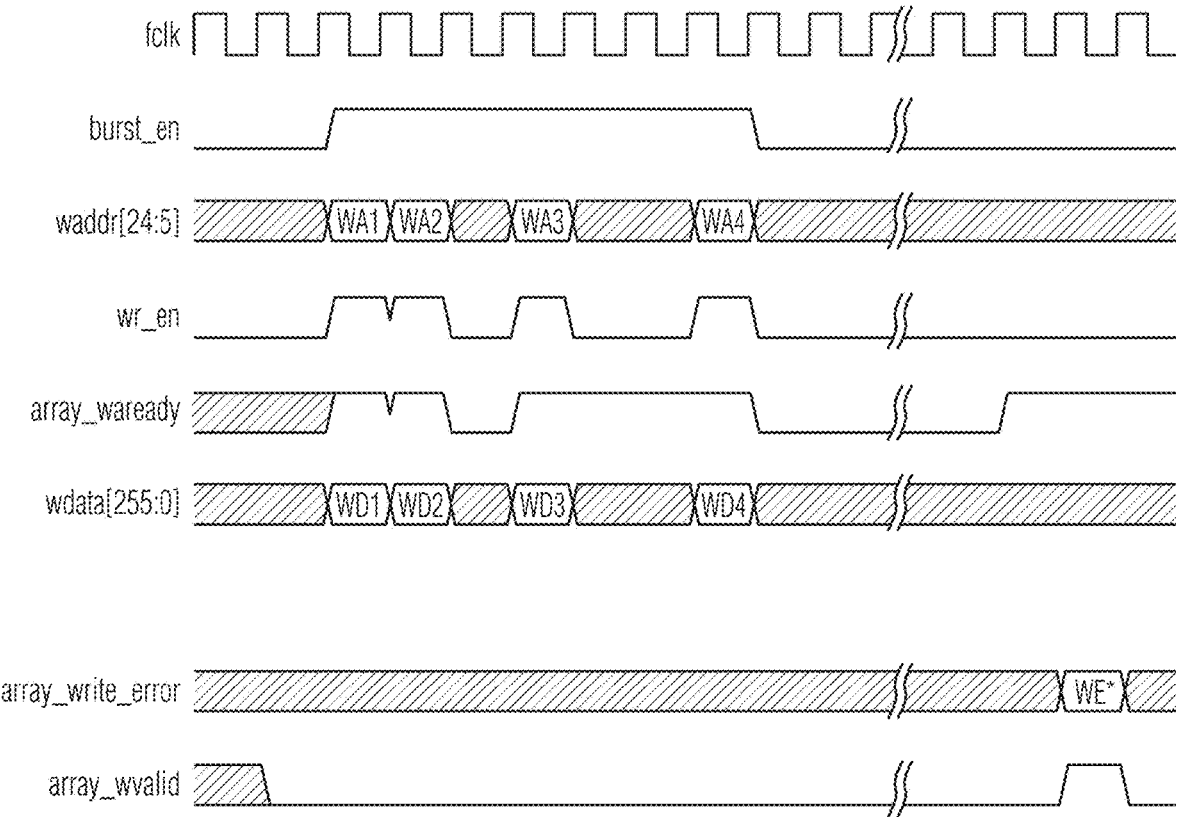

FIG. 6 illustrates an example of a burst write with 3 write beats, and FIG. 7 is similar to the example of FIG. 6, but instead implements a burst write with 4 write beats. For example, if, in the example of FIG. 3 or 4, there had been an additional entry with a page address consecutive to page address 2, the first burst write would have included 4 beats.

Similarly, if there had been additional entries with page addresses consecutive to page address 2 (e.g. to page addresses 3 and 4), the first burst write would have included 5 beats. This is more efficient as compared to the case of needing to have a fixed number of beats per burst write. For example, for either example of FIG. 3 or 4, if any burst write were to require 4 beats, then a burst write would not have been possible from buffer 200. Similarly, if burst writes were only allowed for 2, 4, or 6 beats, then a burst write with 3 beats (which were used for entries 1-3 of FIG. 3 or entries 1, 2, and 4 of FIG. 4) would not have been possible, thus resulting in reduced performance. Also, for fixed burst writes (such as a burst requiring 4 beats), processing time is required to first check the buffer to determine whether there are 4 writes that can even be issued to fulfill the burst write.

Note that, in one embodiment, the maximum number of beats allowed per burst write can be dependent on the number of entries in buffer 200. Note also that burst writes with beats all accessing consecutive pages in a same row are more efficient because no row switch of the NVM is required for the burst write. Not requiring a row switch saves on setup/recovery times during burst writes. However, if a burst spans a row boundary (e.g. from pages 32 to 33 or pages 64 to 65, in the case of 32 pages per row), then a row switch is required.

Therefore, by now it can be understood how the ability to control burst writes without requiring a pre-defined fixed number of beats can provide improve operation for a memory controller. In one aspect, the controller is configured to initiate a burst write to an array, in which the beats for the burst write are determined based on the page addresses stored in the write buffer. In this manner, the buffer entries can be processed out of order and in such as way as to improve efficiency by ensuring consecutive page addresses for the beats within each burst write.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 100 are circuitry located on a single integrated circuit or within a same device. Alternatively, system 100 may include any number of separate integrated circuits or separate devices interconnected with each other. For example, array 110 and array 114, or both, may be located on a same integrated circuit as controller 108 and 112 or on a separate integrated circuit or located within another peripheral or slave discretely separate from other elements of system 100. Peripherals 116 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, NVM 120 may be implemented as any type of NVM such as, for example, magnetoresistive random access memory (MRAM), resistive random access memory (ReRAM), Flash memory, etc. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In an embodiment, a data processing system includes a system interconnect; a requesting device coupled to the system interconnect; and a non-volatile memory (NVM) controller coupled to the system interconnect and configured to control reads from and writes to an NVM array. The NVM controller includes a write buffer having a plurality of entries, each entry configured to store a write access having a corresponding page address of the NVM array and corresponding write data; and a buffer control circuit configured to store write accesses to the NVM array into the write buffer based on write access requests received from the requesting device via the system interconnect, and generate burst writes from the write buffer to the NVM array, wherein the buffer control circuit generates a burst write by sequentially selecting write accesses from the write buffer which have consecutive page addresses, wherein the length of the burst write is undefined when the burst write to the NVM array is initiated. In one aspect, the buffer control circuit is configured to, after sequentially selecting each write access from the write buffer, send the sequentially selected write access as a next write beat of the burst write to the NVM array. In another aspect of the above embodiment, the buffer control circuit is configured to initiate the burst write by selecting a valid entry with a lowest page address as a first valid entry from the write buffer and sending a first write beat for the write access of the first valid entry to the NVM array. In a further aspect, the buffer control circuit is configured to continue the burst write by, after sending the first write beat, selecting a second valid entry from the write buffer whose corresponding page address is immediately consecutive to the corresponding page address of the first write beat, and sending a second write beat for the write access of the second valid entry to the NVM array. In yet a further aspect, the buffer control circuit is configured to close the burst write to the NVM array when, after sending the second write beat, a valid entry with a corresponding page address immediately consecutive to a corresponding page address of a previously sent write beat is not found in the write buffer. In yet an even further aspect, the buffer control circuit is configured to, after closing the burst write, initiate a second burst write by selecting a third valid entry from the write buffer and sending a first beat of the second burst write for the write access of the third valid entry to the NVM array. In another embodiment of the above embodiment, sequentially selecting write accesses from the write buffer which have consecutive page addresses includes selecting a next write access from the write buffer to send as a next write beat of the burst write whose corresponding page address is immediately consecutive to a corresponding page address of an immediately previously sent write beat of the burst write. In yet another aspect, the buffer control circuit is configured to generate the burst write by sequentially selecting write accesses from the write buffer which have consecutive page addresses until a valid entry with a corresponding page address immediately consecutive to a corresponding page address of a previously sent write beat is not found in the write buffer which results in the buffer control circuit closing the burst write. In yet another aspect, the length of the burst write is defined by closing the burst write. In yet another aspect, the NVM array is characterized as one of a magnetoresistive random access memory (MRAM), resistive random access memory (RRAM), or flash memory.

In another embodiment, in a non-volatile memory (NVM) controller configured to control reads from and write to an NVM array, a method includes storing each received write access request to the NVM array into a write buffer having a plurality of entries, each entry configured to store a write access having a corresponding page address of the NVM array and corresponding write data; initiating a burst write from the write buffer to the NVM array by selecting a valid entry with a lowest page address as a first valid entry from the write buffer and sending a first write beat of the burst write for the first valid entry to the NVM array, wherein the length of the burst write is undefined upon sending the first write beat of the burst write; continuing the burst write from the write buffer to the NVM array by selecting a next valid entry from the write buffer whose corresponding page address is immediately consecutive to a corresponding page address of an immediately previously sent write beat of the burst write and sending a next write beat of the burst write for the next valid entry to the NVM array; and closing the burst write, wherein the length of the burst write is defined upon closing the burst write. In one aspect of the another embodiment, the method further includes repeating the continuing the burst write from the write buffer to the NVM array until a valid entry with an immediately consecutive corresponding page address is not found in the write buffer which results in closing the burst write. In a further aspect, the method further includes, after closing the burst write, initiating a second burst write from the write buffer to the NVM array by selecting a second valid entry from the write buffer which has a lowest page address of remaining valid entries of the write buffer, and sending a first write beat of the second burst write for the second valid entry to the NVM array, wherein the length of the second burst write is undefined upon sending the first write beat of the second burst write. In yet a further aspect, the method further includes continuing the second burst write from the write buffer to the NVM array by selecting a second next valid entry from the write buffer whose corresponding page address is immediately consecutive to a corresponding page address of an immediately previously sent write beat of the second burst write and sending a next write beat of the second burst write for the second next valid entry to the NVM array; and closing the second burst write, wherein the length of the second burst write is defined upon closing the second burst write. In yet a further aspect, the lengths of the first and second burst writes are different.

In yet an other embodiment, a non-volatile memory (NVM) controller configured to control reads from and writes to an NVM array, and the NVM controller includes a write buffer having a plurality of entries, each entry configured to store a write access having a corresponding page address of the NVM array and corresponding write data; and a buffer control circuit configured to store write accesses into the write buffer based on received write access requests, and generate burst writes from the write buffer to the NVM array, wherein the buffer control circuit generates a burst write by sequentially selecting write accesses from the write buffer which have consecutive page addresses, wherein the length of the burst write is undefined when the burst write to the NVM array is initiated. In one aspect of the yet another embodiment, the buffer control circuit is configured to, after sequentially selecting each write access from the write buffer, sending the sequentially selected write access as a next write beat of the burst write to the NVM array. In a further aspect, the buffer control circuit is configured to generate the burst write by sequentially selecting write accesses from the write buffer which have consecutive page addresses until a valid entry with a corresponding page address immediately consecutive to a corresponding page address of a previously sent write beat is not found in the write buffer which results in the buffer control circuit closing the burst write. In yet a further aspect, the length of the burst write is defined upon closing the burst write. In another aspect of the yet another embodiment, sequentially selecting write accesses from the write buffer which have consecutive page addresses comprises selecting a next write access from the write buffer to send as a next write beat of the burst write whose corresponding page address is immediately consecutive to a corresponding page address of an immediately previously sent write beat of the burst write.

What is claimed is:

1. A data processing system comprising:
a system interconnect;
a requesting device coupled to the system interconnect; and
a non-volatile memory (NVM) controller coupled to the system interconnect and configured to control reads from and writes to an NVM array, the NVM controller comprising:
a write buffer having a plurality of entries, each entry configured to store a write access having a corresponding page address of the NVM array and corresponding write data; and a buffer control circuit configured to:
store write accesses to the NVM array into the write buffer based on write access requests received from the requesting device via the system interconnect, and
generate burst writes from the write buffer to the NVM array,
wherein the buffer control circuit generates a burst write by initiating the burst write by selecting a valid entry with a lowest page address as a first valid entry from the write buffer, sending a first write beat for the write access of the first valid entry to the NVM array, and sequentially selecting write accesses from the write buffer which have consecutive page addresses,
wherein the length of the burst write is undefined when the burst write to the NVM array is initiated.

2. The data processing system of claim 1, wherein the buffer control circuit is configured to, after sequentially selecting each write access from the write buffer, send the sequentially selected write access as a next write beat of the burst write to the NVM array.

3. The data processing system of claim 1, wherein the buffer control circuit is configured to continue the burst write by, after sending the first write beat, selecting a second valid entry from the write buffer whose corresponding page address is immediately consecutive to the corresponding page address of the first write beat, and sending a second write beat for the write access of the second valid entry to the NVM array.

4. The data processing system of claim 3, wherein the buffer control circuit is configured to close the burst write to the NVM array when, after sending the second write beat, a valid entry with a corresponding page address immediately consecutive to a corresponding page address of a previously sent write beat is not found in the write buffer.

5. The data processing system of claim 4, wherein the buffer control circuit is configured to, after closing the burst write, initiate a second burst write by selecting a third valid entry from the write buffer and sending a first beat of the second burst write for the write access of the third valid entry to the NVM array.

6. The data processing system of claim 1, wherein sequentially selecting write accesses from the write buffer which have consecutive page addresses comprises selecting a next write access from the write buffer to send as a next write beat of the burst write whose corresponding page address is immediately consecutive to a corresponding page address of an immediately previously sent write beat of the burst write.

7. The data processing system of claim 1, wherein the buffer control circuit is configured to generate the burst write by sequentially selecting write accesses from the write buffer which have consecutive page addresses until a valid entry with a corresponding page address immediately consecutive to a corresponding page address of a previously sent write beat is not found in the write buffer which results in the buffer control circuit closing the burst write.

8. The data processing system of claim 1, wherein the length of the burst write is defined by closing the burst write.

9. The data processing system of claim 1, wherein the NVM array is characterized as one of a magneto-resistive random access memory (MRAM), resistive random access memory (RRAM), or flash memory.

10. In a non-volatile memory (NVM) controller configured to control reads from and write to an NVM array, a method comprises:

storing each received write access request to the NVM array into a write buffer having a plurality of entries, each entry configured to store a write access having a corresponding page address of the NVM array and corresponding write data;

initiating a burst write from the write buffer to the NVM array by selecting a valid entry with a lowest page address as a first valid entry from the write buffer and sending a first write beat of the burst write for the first valid entry to the NVM array, wherein the length of the burst write is undefined upon sending the first write beat of the burst write;

continuing the burst write from the write buffer to the NVM array by selecting a next valid entry from the write buffer whose corresponding page address is immediately consecutive to a corresponding page address of an immediately previously sent write beat of the burst write and sending a next write beat of the burst write for the next valid entry to the NVM array; and closing the burst write, wherein the length of the burst write is defined upon closing the burst write.

11. The method of claim 10, further comprising:

repeating the continuing the burst write from the write buffer to the NVM array until a valid entry with an immediately consecutive corresponding page address is not found in the write buffer which results in closing the burst write.

12. The method of claim 11, further comprising:

after closing the burst write, initiating a second burst write from the write buffer to the NVM array by selecting a second valid entry from the write buffer which has a lowest page address of remaining valid entries of the write buffer, and sending a first write beat of the second burst write for the second valid entry to the NVM array, wherein the length of the second burst write is undefined upon sending the first write beat of the second burst write.

13. The method of claim 12, further comprising:

continuing the second burst write from the write buffer to the NVM array by selecting a second next valid entry from the write buffer whose corresponding page address is immediately consecutive to a corresponding page address of an immediately previously sent write beat of the second burst write and sending a next write beat of the second burst write for the second next valid entry to the NVM array; and closing the second burst write, wherein the length of the second burst write is defined upon closing the second burst write.

14. The method of claim 13, wherein the lengths of the first and second burst writes are different.

15. A non-volatile memory (NVM) controller configured to control reads from and writes to an NVM array, the NVM controller comprising:

a write buffer having a plurality of entries, each entry configured to store a write access having a corresponding page address of the NVM array and corresponding write data; and a buffer control circuit configured to:

store write accesses into the write buffer based on received write access requests, and generate burst writes from the write buffer to the NVM array, wherein the buffer control circuit generates a burst write by initiating the burst write by selecting a valid entry with a lowest page address as a first valid entry from the write buffer, sending a first write beat for the write access of the first valid entry to the NVM array, and sequentially selecting write accesses from the write buffer which have consecutive page addresses, wherein the length of the burst write is undefined when the burst write to the NVM array is initiated.

16. The NVM controller of claim 15, wherein the buffer control circuit is configured to, after sequentially selecting each write access from the write buffer, sending the sequentially selected write access as a next write beat of the burst write to the NVM array.

17. The data processing system of claim 16, wherein the buffer control circuit is configured to generate the burst write by sequentially selecting write accesses from the write buffer which have consecutive page addresses until a valid entry with a corresponding page address immediately consecutive to a corresponding page address of a previously sent write beat is not found in the write buffer which results in the buffer control circuit closing the burst write.

18. The data processing system of claim 17, wherein the length of the burst write is defined upon closing the burst write.

19. The NVM controller of claim 15, wherein sequentially selecting write accesses from the write buffer which have consecutive page addresses comprises selecting a next write access from the write buffer to send as a next write beat of the burst write whose corresponding page address is immediately consecutive to a corresponding page address of an immediately previously sent write beat of the burst write.

* * * * *